United States Patent
Izumi et al.

(10) Patent No.: US 11,731,912 B2
(45) Date of Patent: Aug. 22, 2023

(54) POROUS CERAMIC STRUCTURE

(71) Applicant: NGK INSULATORS, LTD., Nagoya (JP)

(72) Inventors: Yunie Izumi, Nisshin (JP); Kennichi Hidaka, Nagoya (JP); Akihiro Miura, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 69 days.

(21) Appl. No.: 17/444,197

(22) Filed: Aug. 2, 2021

(65) Prior Publication Data

US 2022/0064075 A1    Mar. 3, 2022

(30) Foreign Application Priority Data

Sep. 3, 2020    (JP) .................. 2020-148171

(51) Int. Cl.
C04B 38/00     (2006.01)
C04B 35/195    (2006.01)
F01N 3/28      (2006.01)

(52) U.S. Cl.
CPC ........ C04B 38/0009 (2013.01); C04B 35/195 (2013.01); C04B 2235/3229 (2013.01); C04B 2235/3244 (2013.01); C04B 2235/3481 (2013.01); F01N 3/2828 (2013.01); F01N 2330/30 (2013.01)

(58) Field of Classification Search
None
See application file for complete search history.

(56) References Cited

U.S. PATENT DOCUMENTS

2017/0274357 A1    9/2017  Izumi

FOREIGN PATENT DOCUMENTS

CN    107226709 A       10/2017
JP    2017-171543 A     9/2017
WO    WO-2018012564 A1 * 1/2018 ............. B01D 53/94

OTHER PUBLICATIONS

Srivastava et al. (Some studies on ceria-zirconia reinforced solvothermally synthesized cordierite nano-composites), Journal of Alloys and Compounds 586 (2014) pp. 581-587 (Year: 2017).*
Machine translation WO2018012564A1 via Espacenet translated Dec. 13, 2022 (Year: 2018).*
"Preparation of Cerium Zirconium Solid Solution and its Application Research on Diesel Oxidation Catalysts," Louji, "Full Database Engineering Technology I," Issue 10, p. B014-323 (Machine translated Title) (Translation is not available).
Chinese Office Action (with English translation) dated Jul. 14, 2022 (Application No. 202110889453.4).

* cited by examiner

Primary Examiner — Elizabeth Collister
(74) Attorney, Agent, or Firm — Burr Patent Law, PLLC

(57) ABSTRACT

A porous ceramic structure includes a porous honeycomb structure composed primarily of cordierite, and Ce- and Zr-containing particles fixedly attached to the honeycomb structure. The Ce- and Zr-containing particles contain Ce and Zr. The Ce- and Zr-containing particles have a fixedly attached portion located inside the honeycomb structure and a protrusion contiguous with the fixedly attached portion and protruding from the honeycomb structure.

9 Claims, 2 Drawing Sheets

POROUS CERAMIC STRUCTURE

CROSS-REFERENCE TO RELATED APPLICATION

The present application claims the benefit of priority to Japanese Patent Application No. 2020-148171 filed on Sep. 3, 2020, the entire contents of which are incorporated herein by reference in its entirety.

TECHNICAL FIELD

The present invention relates to a porous ceramic structure.

BACKGROUND ART

A porous ceramic structure having a honeycomb structure has conventionally been used as a catalytic converter for use in processing for cleaning hazardous substances such as HC, CO, and $NO_x$ contained in an exhaust gas exhausted from an engine of an automobile or other vehicles. Such a porous ceramic structure may be subjected to, for example, a coating process using γ-alumina in order to increase a specific surface area and thereby increase the amount of a catalyst supported, but such a coating process may increase pressure loss in the structure.

In view of this, Japanese Patent Application Laid-Open No. 2017-171543 (Document 1) proposes a technique that eliminates the need for the aforementioned coating process by exposing part of cerium dioxide particles from the surfaces of pores in a honeycomb structure and causing the cerium dioxide particles to support fine catalytic particles of an element of the platinum group. The cerium dioxide particles have oxygen storage and release capability and act as promoters that reduce variations in air-fuel ratio in an exhaust gas by storing or releasing oxygen and thereby maintain high catalytic activity of fine catalytic particles.

Meanwhile, in recent years, various regulations for automobile exhaust gases are becoming more stringent, and there is demand for a further increase of catalytic activity in a catalytic converter.

SUMMARY OF INVENTION

The present invention is intended for a porous ceramic structure, and it is an object of the present invention to improve promoter activity in the porous ceramic structure.

A porous ceramic structure according to one preferable embodiment of the present invention includes a porous structure body composed primarily of cordierite, and Ce- and Zr-containing particles containing Ce and Zr and fixedly attached to the structure body. The Ce- and Zr-containing particles have a fixedly attached portion located inside the structure body, and a protrusion contiguous with the fixedly attached portion and protruding from the structure body.

Accordingly, it is possible to improve promoter activity in the porous ceramic structure.

Preferably, a total content of Ce and Zr is higher than or equal to 6.0% by mass and lower than or equal to 20% by mass in terms of $CeO_2$ and $ZrO_2$.

Preferably, a Ce content is higher than or equal to 5.0% by mass and lower than or equal to 15% by mass in terms of $CeO_2$.

Preferably, a Zr content is higher than or equal to 1.0% by mass and lower than or equal to 5.0% by mass in terms of $ZrO_2$.

Preferably, at least part of Ce exists as $CeO_2$.

Preferably, at least part of Zr is dissolved as a solid solution in $CeO_2$.

Preferably, a ratio of an amount of substance of Zr to a total amount of substances of Ce and Zr in $CeO_2$ with Zr dissolved therein as a solid solution is higher than or equal to 10% and lower than or equal to 20%.

Preferably, the Ce- and Zr-containing particles have an average particle diameter greater than or equal to 10 nm and less than or equal to 2 μm.

Preferably, catalyst particles are supported by the Ce- and Zr-containing particles.

These and other objects, features, aspects and advantages of the present invention will become more apparent from the following detailed description of the present invention when taken in conjunction with the accompanying drawings.

DESCRIPTION OF EMBODIMENTS

Figure 1:
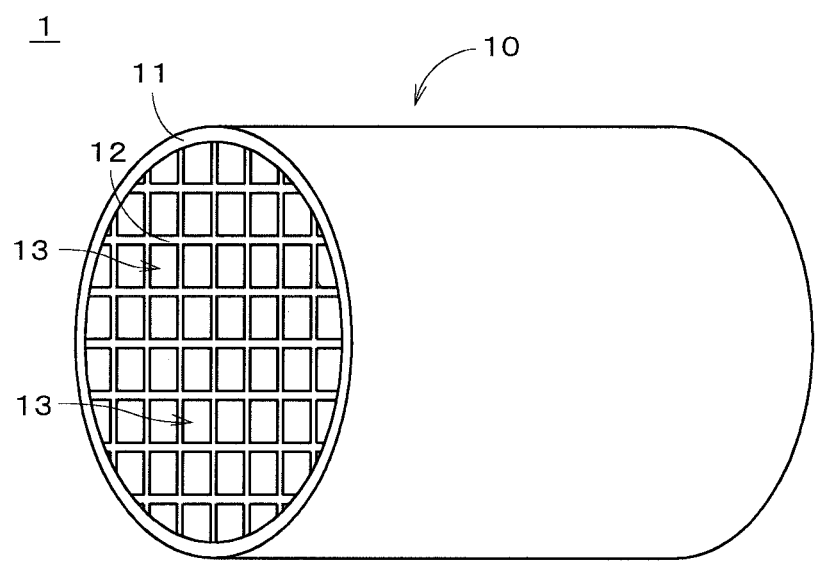
FIG. 1 is a perspective view of a porous ceramic structure.

FIG. 1 is a perspective view illustrating a porous ceramic structure 1 according to one embodiment of the present invention. For example, the porous ceramic structure 1 is a catalyst carrier for cleaning an exhaust gas used in the purification of an exhaust gas exhausted from an engine. In FIG. 1, the number of cells 13 illustrated, which will be described later, is smaller than an actual number.

The porous ceramic structure 1 includes a honeycomb structure 10 serving as a porous structure body, and Ce- and Zr-containing particles fixedly attached to the honeycomb structure 10. The Ce- and Zr-containing particles are fine particles containing cerium (Ce) and zirconium (Zr). The Ce- and Zr-containing particles support oxidation catalyst particles such as the aforementioned precious metal (e.g., elements of the platinum group such as platinum (Pt) or palladium (Pd)). In the porous ceramic structure 1, fine particles other than the Ce- and Zr-containing particles may be fixedly attached to the honeycomb structure 10, in addition to the Ce- and Zr-containing particles.

The honeycomb structure 10 includes a tubular outer wall 11 and a partition wall 12. The tubular outer wall 11 has a tubular shape extending in a longitudinal direction (i.e., substantially the right-left direction in FIG. 1). For example, the tubular outer wall 11 may have a circular shape in cross section perpendicular to the longitudinal direction, and may have any other shape such as a polygon. The partition wall 12 is provided in the interior of the tubular outer wall 11 and partitions the interior into a plurality of cells 13. The honeycomb structure 10 is a cell structure whose interior is partitioned into a plurality of cells 13 by the partition wall 12. The tubular outer wall 11 and the partition wall 12 are each made of a porous material. From the viewpoint of increasing the strength of the porous ceramic structure 1, the partition wall 12 has, for example, a thickness greater than or equal to 50 micrometers (μm), preferably greater than or equal to 100 μm, and more preferably greater than or equal to 150 μm. From the viewpoint of reducing pressure loss in the partition wall 12, the thickness of the partition wall 12 is, for example, less than or equal to 500 μm and preferably less than or equal to 450 μm.

Each cells 13 is a space extending in the longitudinal direction and forms a flow path that passes an exhaust gas from an engine. For example, the cells 13 may have a polygonal (e.g., triangular, quadrangular, pentagonal, or hexagonal) shape in cross section perpendicular to the longitudinal direction, and may have any other shape such as a circle. The cells 13 typically have the same cross-sectional shape. Alternatively, the cells 13 may include cells 13 that have different cross-sectional shapes. From the viewpoint of improving oxidation performance of the porous ceramic structure 1, the density of the cells (cell density) is, for example, higher than or equal to 8 cells per square centimeters (cells/cm$^2$) and preferably higher than or equal to 15 cells/cm$^2$. From the viewpoint of reducing pressure loss, the cell density is, for example, lower than or equal to 95 cells/cm$^2$ and preferably lower than or equal to 78 cells/cm$^2$.

The honeycomb structure 10 is composed primarily of cordierite (2MgO.2Al$_2$O$_3$.5SiO$_2$). The honeycomb structure 10 may be composed of only cordierite, or may contain other materials different from cordierite (e.g., metal or ceramic other than cordierite). The content of cordierite in the honeycomb structure 10 is, for example, higher than or equal to 75% by mass and preferably higher than or equal to 80% by mass. In the present embodiment, the honeycomb structure 10 is substantially composed of only cordierite.

From the viewpoint of reducing pressure loss in the porous ceramic structure 1, the partition wall 12 of the honeycomb structure 10 has, for example, an open porosity higher than or equal to 25%, preferably higher than or equal to 30%, and more preferably higher than or equal to 35%. From the viewpoint of ensuring the strength of the porous ceramic structure 1, the open porosity of the partition wall 12 is, for example, lower than or equal to 70% and preferably lower than or equal to 65%. The open porosity can be measured by, for example, the Archimedes method using deionized water as a medium.

The partition wall 12 of the honeycomb structure 10 has, for example, a mean pore diameter greater than or equal to 5 μm and preferably greater than or equal to 8 μm. Like the open porosity, pressure loss in the porous ceramic structure 1 decreases as the mean pore diameter of the partition wall 12 increases. From the viewpoint of improving catalytic activity in the porous ceramic structure 1, the mean pore diameter of the honeycomb structure 10 is, for example, less than or equal to 40 μm, preferably less than or equal to 30 μm, and more preferably less than or equal to 25 μm. The mean pore diameter can be measured by, for example, mercury porosimetry (compliant with JIS R1655).

Figure 2:
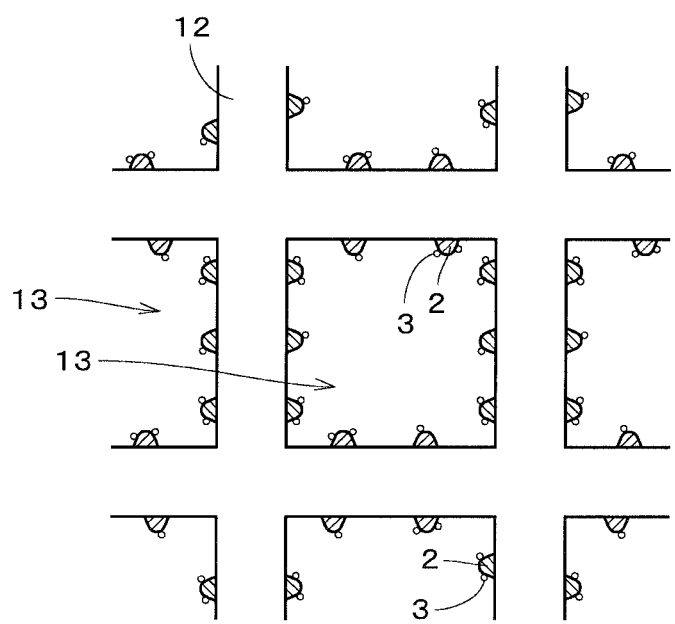
FIG. 2 is a schematic diagram illustrating part of a partition wall in enlarged dimensions.

FIG. 2 is a schematic diagram illustrating part of the partition wall 12 of the porous ceramic structure 1 in enlarged dimensions. The aforementioned Ce- and Zr-containing particles 2 are fixedly attached to the surface of the partition wall 12 of the honeycomb structure 10 in an exposed manner. The surface of the partition wall 12 refers to the outer surface of the partition wall 12 (i.e., the surface surrounding the cells 13) and the inner surfaces of a large number of small pores in the partition wall 12. In FIG. 2, the Ce- and Zr-containing particles 2 on the surface of the partition wall 12 are cross-hatched. Moreover, fine catalytic particles 3 such as precious metal particles supported on the surface of the Ce- and Zr-containing particles 2 are also illustrated in FIG. 2. The Ce- and Zr-containing particles 2 generally have particle diameters greater than the particle diameters of the fine catalytic particles 3. Note that the particle diameters of the Ce- and Zr-containing particles 2 and the fine catalytic particles 3 in FIG. 2 are illustrated larger than actual particle diameters.

As described above, in the porous ceramic structure 1, the fine catalytic particles 3 are supported by the Ce- and Zr-containing particles 2 exposed to the surface of the partition wall 12. This facilitates an increase in the amount of fine catalytic particles 3 supported, without increasing the specific surface area of the partition wall 12 by a conventional coating process (wash coating) using γ-alumina. Therefore, it is possible to, for example, prevent an increase in pressure loss from being caused by a coating process using γ-alumina. It is not an absolute necessity that all of the fine catalytic particles 3 are supported by the Ce- and Zr-containing particles 2, and some of the fine catalytic particles 3 may be supported directly on the surface of the honeycomb structure 10.

Figure 3:
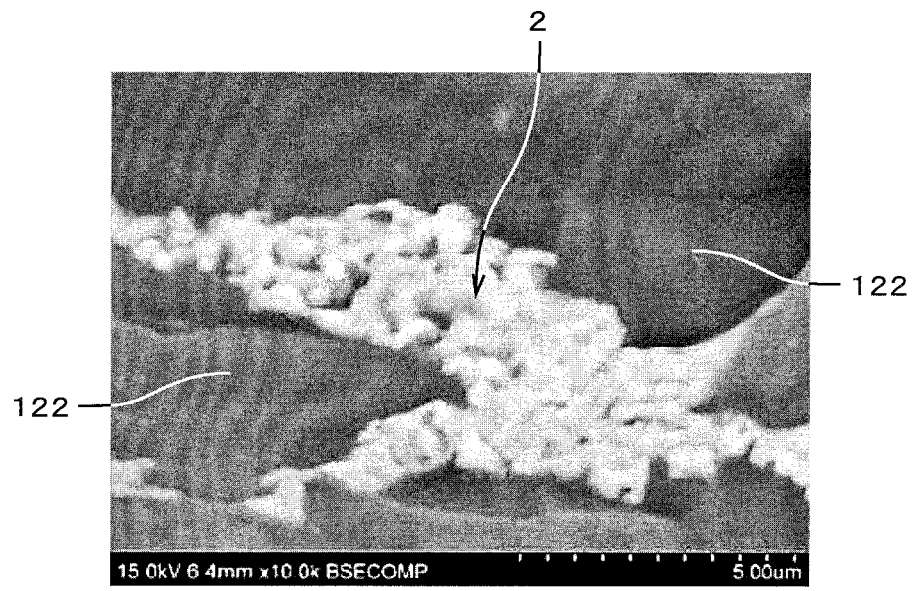
FIG. 3 shows an SEM image of the surface of the partition wall.

FIG. 3 shows a scanning electron microscope (SEM) image of the surface of the partition wall 12 in the honeycomb structure 10. In the porous ceramic structure 1, the particulate Ce- and Zr-containing particles 2 (white portions in the image) are fixedly attached to the surface of the honeycomb structure 10. For example, the Ce- and Zr-containing particles 2 are fixedly attached to the grain boundaries of a large number of cordierite crystals 122 (gray portions in the image), which form the honeycomb structure 10, and protrude (i.e., are exposed) from the surface of the honeycomb structure 10 to the surrounding space. FIG. 3 is an illustration of a state before the aforementioned fine catalytic particles 3 (see FIG. 2) are supported by the Ce- and Zr-containing particles 2.

Figure 4:
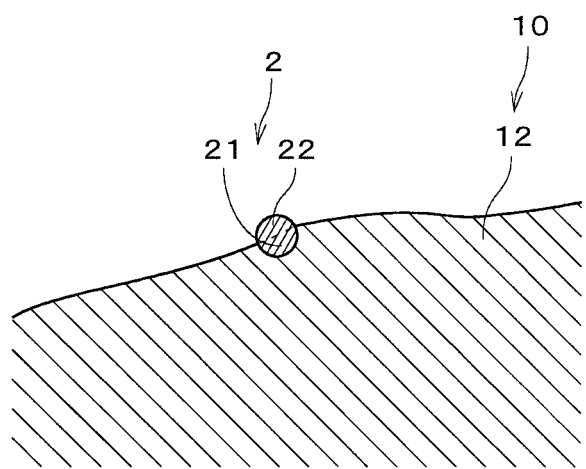
FIG. 4 is a sectional view of an area in the vicinity of a Ce- and Zr-containing particle.

FIG. 4 is a sectional view of an area in the vicinity of a Ce- and Zr-containing particle 2 on the surface of the partition wall 12 of the honeycomb structure 10. As illustrated in FIG. 4, the Ce- and Zr-containing particle 2 is in a form partly protruding from the inside of the honeycomb structure 10 to the surrounding space. In FIG. 4, the aforementioned fine catalytic particles 3 (see FIG. 2) supported on the Ce- and Zr-containing particles 2 are not illustrated.

The Ce- and Zr-containing particle 2 has a fixedly attached portion 21 and a protrusion 22. The fixedly attached portion 21 is located inside the honeycomb structure 10. The language "inside the honeycomb structure 10" refers to inside the cordierite composing the honeycomb structure 10 and does not refer to the internal spaces of small pores provided in the honeycomb structure 10. The fixedly attached portion 21 is a bonding portion of the Ce- and Zr-containing particle 2 that is bonded to the cordierite serving as the principal component of the honeycomb structure 10 and that is fixedly attached to the inside of the cordierite. In other words, the fixedly attached portion 21 is a portion of the Ce- and Zr-containing particle 2 that crawls into the cordierite from the surface of the honeycomb structure 10 to the side opposite to the space around the surface. In yet other words, the fixedly attached portion 21 is an area of the Ce- and Zr-containing particle 2 that has a surface covered with the cordierite. To be more specific, the fixedly attached portion 21 exists at a grain boundary of cordierite crystals 122 (FIG. 3) in the honeycomb structure 10 and is fixedly attached to the grain boundary.

The protrusion 22 is a portion of the Ce- and Zr-containing particle 2 that protrudes from the surface of the honeycomb structure 10 into the surrounding space. In other words, the protrusion 22 is a portion exposed from the surface of the aforementioned cordierite. To be more specific, the protrusion 22 protrudes from a grain boundary of cordierite crystals 122 into the surrounding space. The protrusion 22 is contiguous with the fixedly attached portion 21.

In the porous ceramic structure 1, for example, some of a large number of Ce- and Zr-containing particles 2 are fixedly attached to the surface of the honeycomb structure 10 as described above, and the other Ce- and Zr-containing particles 2 are located in their entirety inside the honeycomb structure 10. Note that substantially all of the Ce- and Zr-containing particles 2 may be fixedly attached to the surface of the honeycomb structure 10. Since the honeycomb structure 10 is not subjected to a coating process using γ-alumina or other materials as described above, there is no case that the Ce- and Zr-containing particles 2 are fixedly attached to the honeycomb structure 10 via a coating formed by such a coating process.

The Ce- and Zr-containing particles 2 have, for example, an average particle diameter greater than or equal to 10 nm and less than or equal to 2 μm, preferably greater than or equal to 10 nm and less than or equal to 500 nm, and more preferably greater than or equal to 10 nm and less than or equal to 200 nm. The average particle diameter of the Ce- and Zr-containing particles 2 is an average particle diameter of the protrusions 22 of the Ce- and Zr-containing particles 2 that can be observed with an SEM. For example, the average particle diameter of the Ce- and Zr-containing particles 2 is obtained by calculating an average value of the particle diameters of Ce- and Zr-containing particles 2 in an image of the Ce- and Zr-containing particles 2 captured with a predetermined magnification using an SEM or a field emission SEM (FE-SEM) or a transmission electron microscope (TEM). Alternatively, a crystallite diameter of the Ce- and Zr-containing particles 2 obtained by X-ray diffraction (XRD) may be regarded as an average particle diameter of the Ce- and Zr-containing particles 2.

A total content of Ce and Zr in the porous ceramic structure 1 is, for example, higher than or equal to 6.0% by mass and lower than or equal to 20% by mass in terms of $CeO_2$ and $ZrO_2$. In the following description, the total content of Ce and Zr in the porous ceramic structure 1 is also simply referred to as a "total Ce/Zr content." The total Ce/Zr content is preferably higher than or equal to 8.0% by mass and lower than or equal to 15% by mass in terms of $CeO_2$ and $ZrO_2$. The total Ce/Zr content in terms of $CeO_2$ and $ZrO_2$ refers to the percentage of a value obtained by dividing the total mass of $CeO_2$ and $ZrO_2$ by the mass of the porous ceramic structure 1 on the assumption that all Ce components contained in the porous ceramic structure 1 exist as $CeO_2$ and all Zr components contained in the porous ceramic structure 1 exist as $ZrO_2$.

The content of Ce in the porous ceramic structure 1 is, for example, higher than or equal to 5.0% by mass and lower than or equal to 15% by mass in terms of $CeO_2$. In the following description, the content of Ce in the porous ceramic structure 1 is also simply referred to as a "Ce content." The Ce content is preferably higher than or equal to 7.0% by mass and lower than or equal to 12% by mass in terms of $CeO_2$. The Ce content in terms of $CeO_2$ refers to the percentage of a value obtained by dividing the mass of $CeO_2$ by the mass of the porous ceramic structure 1 on the assumption that all Ce components contained in the porous ceramic structure 1 exist as $CeO_2$.

The content of Zr in the porous ceramic structure 1 is, for example, higher than or equal to 1.0% by mass and lower than or equal to 5.0% by mass in terms of $ZrO_2$. In the following description, the content of Zr in the porous ceramic structure 1 is also simply referred to as a "Zr content." The Zr content is preferably higher than or equal to 2.0% by mass and lower than or equal to 4.0% by mass in terms of $ZrO_2$. The Zr content in terms of $ZrO_2$ refers to the percentage of a value obtained by dividing the mass of $ZrO_2$ by the mass of the porous ceramic structure 1 on the assumption that all Zr components contained in the porous ceramic structure 1 exist as $ZrO_2$.

In the porous ceramic structure 1, the Zr content in terms of $ZrO_2$ is, for example, higher than or equal to 10% and lower than or equal to 40% of the Ce content in terms of $CeO_2$ and is preferably higher than or equal to 20% and lower than or equal to 35% of the Ce content in terms of $CeO_2$.

At least some of Ce components contained in the porous ceramic structure 1 exist as $CeO_2$. Preferably, substantially a total amount of Ce contained in the porous ceramic structure 1 exists as $CeO_2$. At least some of Zr components contained in the porous ceramic structure 1 are dissolved as a solid solution in $CeO_2$. Preferably, substantially all Zr components contained in the porous ceramic structure 1 are dissolved as a solid solution in $CeO_2$. A ratio of the amount of substance of Zr to the total amount of substances of Ce and Zr in $CeO_2$ with Zr dissolved therein as a solid solution is, for example, higher than or equal to 10% and lower than or equal to 20% (i.e., higher than or equal to 10 mol % and lower than or equal to 20 mol %). This ratio is preferably higher than or equal to 15% and lower than or equal to 20%.

The aforementioned $CeO_2$ stores and releases oxygen due to a reaction expressed by Expression 1 below. The reaction from the left-hand side to the right-hand side in Expression 1 indicates the reaction of $CeO_2$ that releases oxygen, and the reaction from the right-hand side to the left-hand side indicates the reaction of $CeO_2$ that stores oxygen. In this way, $CeO_2$ has oxygen storage and release capability and acts as a promoter that reduces variations in air-fuel ratio in the exhaust gas by storing or releasing oxygen and thereby maintains high catalytic activity of the fine catalytic particles 3 (see FIG. 2).

$$CeO_2=CeO_{2-x}+(x/2)O_2 \qquad \text{(Expression 1)}$$

The porous ceramic structure 1 may be produced by any of various known methods. For example, first, a structure raw material is prepared by weighing and mixing materials for the honeycomb structure 10 and materials for the Ce- and Zr-containing particles 2. The materials for the honeycomb structure 10 are composed primarily of a raw material for cordierite that serves as an aggregate of the honeycomb structure 10 and include, for example, magnesium oxide (MgO), aluminum oxide ($Al_2O_3$), or silicon oxide ($SiO_2$). The materials for the honeycomb structure 10 also include, for example, a bore-forming agent and a binder. The materials for the Ce- and Zr-containing particles 2 are, for example, $CeO_2$ and $ZrO_2$. After the structure raw material is dry mixed in a kneader, water is charged and the structure raw material is further kneaded in the kneader to prepare a green body. The amounts of time required for the dry mixing and the kneading described above may, for example, be 15 minutes and 30 minutes, respectively. The dry mixing time and the kneading time may be modified in various ways.

In the example described above, $CeO_2$ and $ZrO_2$ are individually added to the aggregate and the like of the honeycomb structure 10, but the method of the addition may be modified in various ways. For example, a material generated by immersing Zr in $CeO_2$ and drying and firing a resultant compound may be added to the aggregate and the like of the honeycomb structure 10. In this material, part of Zr may be dissolved as a solid solution in $CeO_2$, or may adhere to $CeO_2$.

The aforementioned green body is molded into a columnar shape by a vacuum kneading machine or any other machine and then extruded and molded into a honeycomb compact of a honeycomb shape by an extruder. The honeycomb compact includes therein a grid-like partition wall that sections the honeycomb compact into a plurality of cells serving as flow paths for a fluid such as an exhaust gas. Note that the honeycomb compact may be molded by a molding method other than extrusion molding.

Then, the honeycomb compact is subjected to drying. There are no particular limitations on the method of drying the honeycomb compact. Examples of the drying method include hot air drying, microwave drying, dielectric drying, reduced pressure drying, vacuum drying, and freeze drying, and may also include any combination of these drying methods. For example, the honeycomb compact is subjected to microwave drying so as to evaporate approximately 50% to 80% of moisture, and is then subjected to hot air drying (at 60° C. to 100° C. for 6 to 20 hours). Preferably, the honeycomb compact is subjected to microwave drying so as to evaporate approximately 70% of moisture, and is then subjected to hot air drying (at 80° C. for 12 hours). Then, the honeycomb compact is put into a degreasing furnace that is maintained at 450° C. so as to remove (i.e. degrease) organic components remaining in the honeycomb compact.

Thereafter, the honeycomb compact is subjected to a firing process (firing) so as to form the porous ceramic structure 1 including the honeycomb structure 1 and the Ce- and Zr-containing particles 2. For example, the firing process is conducted at a firing temperature of 1300° C. to 1500° C. for 8 hours under atmospheric pressure. The firing temperature is preferably higher than or equal to 1350° C. and more preferably higher than or equal to 1370° C. The firing temperature is also preferably lower than or equal to 1450° C. and more preferably lower than or equal to 1430° C. Conditions for the firing process may be modified appropriately. The fine catalytic particles 3 are to be supported after the firing process described above.

Next, examples of the porous ceramic structure 1 described above and porous ceramic structures according to comparative examples for comparison with the porous ceramic structure 1 will be described with reference to Tables 1 and 2. Numeric values or the like in Tables 1 and 2 indicate values for porous ceramic structures 1 before the fine catalytic particles 3 are supported (i.e., honeycomb structures 10 with the Ce- and Zr-containing particles 2 fixedly attached).

TABLE 1

| | Material Composition (mass %) | | | | | |
|---|---|---|---|---|---|---|
| | MgO | $Al_2O_3$ | $SiO_2$ | $CeO_2$ | $ZrO_2$ | Total |
| Example 1 | 12.9 | 31.8 | 47.2 | 6.1 | 2.0 | 100.0 |
| Example 2 | 12.6 | 30.9 | 45.9 | 7.9 | 2.6 | 100.0 |
| Example 3 | 12.3 | 30.1 | 44.7 | 9.6 | 3.2 | 100.0 |
| Example 4 | 11.9 | 29.4 | 43.6 | 11.3 | 3.8 | 100.0 |
| Example 5 | 12.8 | 31.5 | 46.7 | 8.1 | 1.0 | 100.0 |
| Example 6 | 12.7 | 31.2 | 46.2 | 8.0 | 2.0 | 100.0 |
| Example 7 | 12.5 | 30.8 | 45.8 | 7.9 | 3.0 | 100.0 |
| Example 8 | 12.4 | 30.5 | 45.3 | 7.8 | 3.9 | 100.0 |
| Comparative Example 1 | 12.9 | 31.8 | 47.2 | 8.1 | 0.0 | 100.0 |
| Comparative Example 2 | 14.1 | 34.6 | 51.3 | 0.0 | 0.0 | 100.0 |

TABLE 2

| | Ce- and Zr-Containing Particles (mass %) | Solid Solubility Rate of Zr (mol %) | Average Particle Diameter of Ce-Zr-Containing Particles(nm) | Oxygen Storage Capability |
|---|---|---|---|---|
| Example 1 | 8.1 | 17.2 | 55 | 0.0007 |
| Example 2 | 10.6 | 18.3 | 120 | 0.0008 |
| Example 3 | 12.9 | 17.8 | 630 | 0.0007 |
| Example 4 | 15.0 | 17.2 | 1200 | 0.0006 |
| Example 5 | 9.1 | 11.7 | 130 | 0.0006 |
| Example 6 | 10.0 | 18.3 | 125 | 0.0008 |
| Example 7 | 10.9 | 16.1 | 126 | 0.0007 |
| Example 8 | 11.7 | 12.2 | 128 | 0.0006 |
| Comparative Example 1 | 0.0 | 0.0 | — | 0.0005 |
| Comparative Example 2 | — | — | — | 0.0000 |

In Table 1, the content of each component (mass %) in the composition of the materials for the porous ceramic structure 1 was calculated through analysis based on inductivity coupled plasma (ICP) atomic emission spectroscopy. In Table 2, the content (mass %) of the Ce- and Zr-containing particles 2 refers to a total of the contents (mass %) of $CeO_2$ and $ZrO_2$.

In Table 2, the ratio of the amount of substance of Zr to the total amount of substances of Ce and Zr in $CeO_2$ with Zr dissolved therein as a solid solution (hereinafter, also referred to as "solid solubility rate of Zr") was obtained as follows. First, X-ray diffraction data obtained by measuring the porous ceramic structure 1 with an X-ray diffractometer (rotary anti-cathode X-ray diffractometer: RINT produced by Rigaku Corporation) was analyzed to obtain a lattice constant of $CeO_2$. Then, calibration curves were created for lattice constants obtained in the same manner for samples having known solid solubility of Zr, and the solid solubility rate of Zr (mol %) was obtained using the calibration curves.

In Table 2, the average particle diameter of the Ce- and Zr-containing particles 2 in the porous ceramic structure 1 is an arithmetical mean of the particle diameters of the Ce- and Zr-containing particles 2 measured from the aforementioned SEM image.

In Table 2, the oxygen storage capability of the porous ceramic structure 1 was obtained as follows. First, the porous ceramic structure 1 was placed in a container, and a first gas containing oxygen ($O_2$) is supplied to the internal space of the container to oxidize the Ce- and Zr-containing particles 2 and store oxygen. The first gas was a mixed gas of $O_2$ and an inert gas such as nitrogen ($N_2$), and the content of $O_2$ in the mixed gas was assumed to be 20% by volume. Then, the first gas was exhausted from the internal space of the container, and a second gas containing $H_2$ was supplied to the internal space and passed through a large number of cells 13 in the porous ceramic structure 1. The second gas was a mixed gas of $H_2$ and an inert gas such as $N_2$, and the $H_2$ content in the mixed gas was assumed to be 5% by volume.

In the second gas, $H_2$ reacted with the oxygen released from the Ce- and Zr-containing particles 2 (i.e., oxygen stored in the Ce- and Zr-containing particles 2 as a result of supply of the first gas) to form $H_2O$ when passing through the cells 13. Thus, if the amount of $H_2O$ of the second gas passing through the porous ceramic structure 1 is measured by gas chromatography or other techniques, the amount of oxygen stored in the Ce- and Zr-containing particles 2 can be calculated from a resultant measurement value. Table 2 lists, as the oxygen storage capability of the porous ceramic structures 1, the value obtained by dividing the amount of substance (mol) of $O_2$ calculated from the measurement value of $H_2O$ in the second gas by the amount of substance (mol) of Ce contained in the porous ceramic structures 1. As the oxygen storage capability improves, the Ce- and Zr-containing particles 2 have higher oxygen storage and release capability and, as described above, have a higher function of reducing variations in air-fuel ratio in the exhaust gas. That is, the Ce- and Zr-containing particles 2 exhibit higher promoter activity as the oxygen storage capability improves.

In Example 1, the $CeO_2$ content and the $ZrO_2$ content in the material composition were 6.1% by mass and 2.0% by mass, respectively. The $ZrO_2$ content was approximately one third of the $CeO_2$ content. The content of the Ce- and Zr-containing particles 2 was 8.1% by mass. The solid solubility rate of Zr was 17.2 mol %. The Ce- and Zr-containing particles 2 had an average particle diameter of 55 nm. The oxygen storage capability was 0.0007 and high.

In Example 2, the $CeO_2$ content and the $ZrO_2$ content in the material composition were 7.9% by mass and 2.6% by mass, respectively. The $ZrO_2$ content was approximately one third of the $CeO_2$ content. The content of the Ce- and Zr-containing particles 2 was 10.6% by mass. The solid solubility rate of Zr was 18.3 mol %. The Ce- and Zr-containing particles 2 had an average particle diameter of 120 nm. The oxygen storage capability was 0.0008 and high.

In Example 3, the $CeO_2$ content and the $ZrO_2$ content in the material composition were 9.6% by mass and 3.2% by mass, respectively. The $ZrO_2$ content was approximately one third of the $CeO_2$ content. The content of the Ce- and Zr-containing particles 2 was 12.9% by mass. The solid solubility rate of Zr was 17.8 mol %. The Ce- and Zr-containing particles 2 had an average particle diameter of 630 nm. The oxygen storage capability was 0.0007 and high.

In Example 4, the $CeO_2$ content and the $ZrO_2$ content in the material composition were 11.3% by mass and 3.8% by mass, respectively. The $ZrO_2$ content was approximately one third of the $CeO_2$ content. The content of the Ce- and Zr-containing particles 2 was 15.0% by mass. The solid solubility rate of Zr was 17.2 mol %. The Ce- and Zr-containing particles 2 had an average particle diameter of 1200 nm. The oxygen storage capability was 0.0006 and high.

Comparisons of Example 1 to 4 show that the content of the Ce- and Zr-containing particles 2 increases in order of Examples 1 to 4 and the average particle diameter of the Ce- and Zr-containing particles 2 increases in the order of Examples 1 to 4. In the porous ceramic structure 1, as the content of the Ce- and Zr-containing particles 2 increases, the amount of storage of oxygen and the amount of release of oxygen, caused by the reaction expressed by Expression 1 above, increase and accordingly the oxygen storage capability improves. Moreover, as the average particle diameter of the Ce- and Zr-containing particles 2 decreases, the surface area of the Ce- and Zr-containing particles 2 increases and accordingly the oxygen storage capability improves. In Examples 1 to 4, the Ce- and Zr-containing particles 2 in Example 2, which had a relatively small average particle diameter, exhibit highest oxygen storage capability.

In Example 5, the $CeO_2$ content and the $ZrO_2$ content in the material composition were 8.1% by mass and 1.0% by mass, respectively. The content of the Ce- and Zr-containing particles 2 was 9.1% by mass. The solid solubility rate of Zr was 11.7 mol %. The Ce- and Zr-containing particles 2 had an average particle diameter of 130 nm. The oxygen storage capability was 0.0006 and high.

In Example 6, the $CeO_2$ content and the $ZrO_2$ content in the material composition were 8.0% by mass and 2.0% by mass, respectively. The content of the Ce- and Zr-containing particles 2 was 10.0% by mass. The solid solubility rate of Zr was 18.3 mol %. The Ce- and Zr-containing particles 2 had an average particle diameter of 125 nm. The oxygen storage capability was 0.0008 and high.

In Example 7, the $CeO_2$ content and the $ZrO_2$ content in the material composition were 7.9% by mass and 3.0% by mass, respectively. The content of the Ce- and Zr-containing particles 2 was 10.9% by mass. The solid solubility rate of Zr was 16.1 mol %. The Ce- and Zr-containing particles 2 had an average particle diameter of 126 nm. The oxygen storage capability was 0.0007 and high.

In Example 8, the $CeO_2$ content and the $ZrO_2$ content in the material composition were 7.8% by mass and 3.9% by mass, respectively. The content of the Ce- and Zr-containing particles 2 was 11.7% by mass. The solid solubility rate of Zr was 12.2 mol %. The Ce- and Zr-containing particles 2 had an average particle diameter of 128 nm. The oxygen storage capability was 0.0006 and high.

Comparisons of Examples 5 to 8 show that the $CeO_2$ content in the material composition was set to approximately 8% by mass, and the $ZrO_2$ content in the material composition was incremented by approximately 1.0% by mass from 1.0% by mass to 3.9% by mass. As a result, the solid solubility rate of Zr was highest in Example 6 and was second highest in Example 7. The oxygen storage capability was also highest in Example 6 and was second highest in Example 7. In Examples 5 to 8, the Ce- and Zr-containing particles 2 had an average particle diameter of 125 nm to 130 nm, i.e., had an approximately the same average particle diameter.

In Comparative Example 1, the $CeO_2$ content and the $ZrO_2$ content in the material composition were 8.1% by mass and 0.0% by mass, respectively. That is, in Comparative Example 1, the $CeO_2$ content in the material composition was approximately the same as the $CeO_2$ contents in Examples 2 and 5 to 8, and Zr was not included in the materials. In Comparative Example 1, the oxygen storage capability was 0.0005 and low.

In Comparative Example 2, the $CeO_2$ content and the $ZrO_2$ content in the material composition were 0.0% by mass and 0.0% by mass, respectively. That is, in Comparative Example 2, Ce and Zr were not included in the materials. In Comparative Example 2, the oxygen storage capability was 0.0000.

As described above, the porous ceramic structure 1 includes the porous structure body (in the above-described example, the honeycomb structure 10) composed primarily of cordierite, and the Ce- and Zr-containing particles 2 fixedly attached to the structure body. The Ce- and Zr-containing particles 2 contain Ce and Zr. The Ce- and Zr-containing particles 2 have a fixedly attached portion 21 located inside the structure body and a protrusion 22 contiguous with the fixedly attached portion 21 and protruding from the structure body. This configuration improves promoter activity in the porous ceramic structure 1 as described above.

Preferably, in the porous ceramic structure 1, catalytic particles (i.e., fine catalytic particles 3) are supported on the Ce- and Zr-containing particles 2. Since the Ce- and Zr-containing particles 2 improve promoter activity in the porous ceramic structure 1 as described above, the fine catalytic particles 3 improve catalytic activity. Moreover, there is no need for processes such as a coating process described above in order to improve catalytic activity, it is possible to prevent an increase in pressure loss caused by such a coating process. Accordingly, it is possible to achieve both high activation of the catalyst and a reduction in pressure loss in the porous ceramic structure 1.

As described above, in the porous ceramic structure 1, the total Ce/Zr content is preferably higher than or equal to 6.0% by mass and lower than or equal to 20% by mass in terms of $CeO_2$ and $ZrO_2$. This further improves promoter activity in the porous ceramic structure 1 as shown in Examples 1 to 8.

As described above, in the porous ceramic structure 1, the Ce content is preferably higher than or equal to 5.0% by mass and lower than or equal to 15% by mass in terms of $CeO_2$. This further improves promoter activity in the porous ceramic structure 1 as shown in Examples 1 to 8.

As described above, in the porous ceramic structure 1, the Zr content is preferably higher than or equal to 1.0% by mass and lower than or equal to 5.0% by mass in terms of $ZrO_2$. This further improves promoter activity in the porous ceramic structure 1 as shown in Examples 1 to 8.

As described above, at least part of Ce in the porous ceramic structure 1 preferably exists as $CeO_2$. This allows the porous ceramic structure 1 to exhibit favorable promoter activity.

As described above, at least part of Zr in the porous ceramic structure 1 is preferably dissolved as a solid solution in $CeO_2$. This allows the porous ceramic structure 1 to exhibit favorable promoter activity. More preferably, the ratio of the amount of substance of Zr to the total amount of substances of Ce and Zr in $CeO_2$ with Zr dissolved therein as a solid solution is higher than or equal to 10% and lower than or equal to 20%. This further improves promoter activity in the porous ceramic structure 1.

As described above, the Ce- and Zr-containing particles 2 preferably have an average particle diameter greater than or equal to 10 nm and less than or equal to 2 μm. The Ce- and Zr-containing particles 2 with an average particle diameter greater than or equal to 10 nm can favorably support the fine catalytic particles 3. Moreover, the Ce- and Zr-containing particles 2 with an average particle diameter less than or equal to 2 μm increase the specific surface area of the Ce- and Zr-containing particles 2 exposed from the honeycomb structure 10 and favorably improve promoter activity in the porous ceramic structure 1.

The porous ceramic structure 1 described above may be modified in various ways.

For example, the shapes of the Ce- and Zr-containing particles 2 are not limited to particulate shapes and may be any of other various shapes (e.g., fiber shape). The fixedly attached portions 21 of the Ce- and Zr-containing particles 2 do not necessarily have to exist at grain boundaries of the cordierite crystals 122, and the protrusions 22 also do not necessarily have to protrude from the grain boundaries.

The average particle diameter of the Ce- and Zr-containing particles 2 may be less than 10 nm, or may be greater than 2 μm.

In the porous ceramic structure 1, the total Ce/Zr content may be lower than 6.0% by mass or may be higher than 20% by mass in terms of $CeO_2$ and $ZrO_2$. The Ce content may be lower than 5.0% by mass or may be higher than 15% by mass in terms of $CeO_2$. The Zr content may be lower than 1.0% by mass or may be higher than 5.0% by mass in terms of $ZrO_2$.

In the porous ceramic structure 1, the ratio of the amount of substance of Zr to the total amount of substances of Ce and Zr in $CeO_2$ with Zr dissolved therein as a solid solution may be lower than 10% or may be higher than 20%. Note that Zr does not necessarily have to be dissolved as a solid solution in $CeO_2$. Also, Ce may exist in a form other than $CeO_2$.

In the porous ceramic structure 1, the shape of the structure body described above is not limited to a honeycomb shape, and may be any of various shapes other than the honeycomb shape (e.g., generally cylinder-like shape).

The method of producing the porous ceramic structure 1 is not limited to the method described above, and may be modified in various ways.

The porous ceramic structure 1 may be used in applications other than for use as a catalyst carrier for cleaning an exhaust gas.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The porous ceramic structure according to the present invention is applicable as a catalyst carrier such as catalyst carrier for cleaning an automobile exhaust gas.

REFERENCE SIGNS LIST

1 Porous ceramic structure
2 Ce- and Zr-containing particles
3 Fine catalytic particles
10 Honeycomb structure
21 Fixedly attached portion
22 Protrusion

The invention claimed is:
1. A porous ceramic structure comprising:
a porous structure body composed of higher than or equal to 75% by mass cordierite; and
Ce- and Zr-containing particles containing Ce and Zr and fixedly attached to the structure body,
wherein the Ce- and Zr-containing particles have:
a fixedly attached portion located inside the structure body;
a protrusion contiguous with the fixedly attached portion and protruding from the structure body; and
an open porosity of the porous structure body is higher than or equal to 25%.
2. The porous ceramic structure according to claim 1, wherein
a total content of Ce and Zr is higher than or equal to 6.0% by mass and lower than or equal to 20% by mass in terms of $CeO_2$ and $ZrO_2$.
3. The porous ceramic structure according to claim 1, wherein
a Ce content is higher than or equal to 5.0% by mass and lower than or equal to 15% by mass in terms of $CeO_2$.
4. The porous ceramic structure according to claim 1, wherein
a Zr content is higher than or equal to 1.0% by mass and lower than or equal to 5.0% by mass in terms of $ZrO_2$.
5. The porous ceramic structure according to claim 1, wherein
at least part of Ce exists as $CeO_2$.

6. The porous ceramic structure according to claim 5, wherein
at least part of Zr is dissolved as a solid solution in $CeO_2$.

7. The porous ceramic structure according to claim 6, wherein
a ratio of an amount of substance of Zr to a total amount of substances of Ce and Zr in $CeO_2$ with Zr dissolved therein as a solid solution is higher than or equal to 10% and lower than or equal to 20%.

8. The porous ceramic structure according to claim 1, wherein
the Ce- and Zr-containing particles have an average particle diameter greater than or equal to 10 nm and less than or equal to 2 μm.

9. The porous ceramic structure according to claim 1, wherein
catalyst particles are supported by the Ce- and Zr-containing particles.

* * * * *